United States Patent [19]

Adams et al.

[11] 4,040,345
[45] Aug. 9, 1977

[54] TICKET ADVANCE AND PRINTER MECHANISM

[75] Inventors: Ralph Delta Adams, Escondido; Charles Junior Ingram, El Cajon, both of Calif.

[73] Assignee: Cubic-Western Data, San Diego, Calif.

[21] Appl. No.: 675,946

[22] Filed: Apr. 12, 1976

[51] Int. Cl.² .............................................. B41J 1/44
[52] U.S. Cl. .................................. 101/66; 101/93.22; 101/292
[58] Field of Search .................. 101/66, 67, 69, 93.18, 101/93.21, 93.28–93.34, 232–235, 242–245, 291, 292, 93.22; 197/128–133; 271/110, 227, 245

[56] References Cited

U.S. PATENT DOCUMENTS

| | | | |
|---|---|---|---|
| 3,537,393 | 1/1970 | Hegi | 101/235 |
| 3,651,503 | 3/1972 | Kono | 101/66 X |
| 3,731,622 | 5/1973 | Baranoff | 101/93.22 |
| 3,734,011 | 5/1973 | Williams | 101/235 X |
| 3,899,971 | 8/1975 | Dudley | 101/292 |
| 3,921,516 | 11/1975 | Toft et al. | 101/66 X |
| 3,951,061 | 4/1976 | Bremoer et al. | 101/93.21 X |

OTHER PUBLICATIONS

Malinacki, IBM Technical Disclosure Bulletin, vol. 11, No. 2, July 1968, p. 186.

Primary Examiner—Edward M. Coven
Attorney, Agent, or Firm—Brown & Martin

[57] ABSTRACT

A mechanism for handling a ticket, as for a public transportation system or the like, in which the ticket has a known original value that is updated after each use by a printed visual readout and a magnetically recorded coded record. The mechanism receives a ticket and advances it through an initial stage in which the magnetic record is read and updated. The ticket then advances to a printer, where a single high speed stepper motor drives the ticket and the multiple character print drum, the stepped advance being in increments of character line spacing. At the appropriate line position, the advance drive is disengaged and the new value is printed while the ticket is stationary, after which the drive is engaged to eject the ticket. The action is very rapid and a ticket can be processed in considerably less than one second.

2 Claims, 9 Drawing Figures

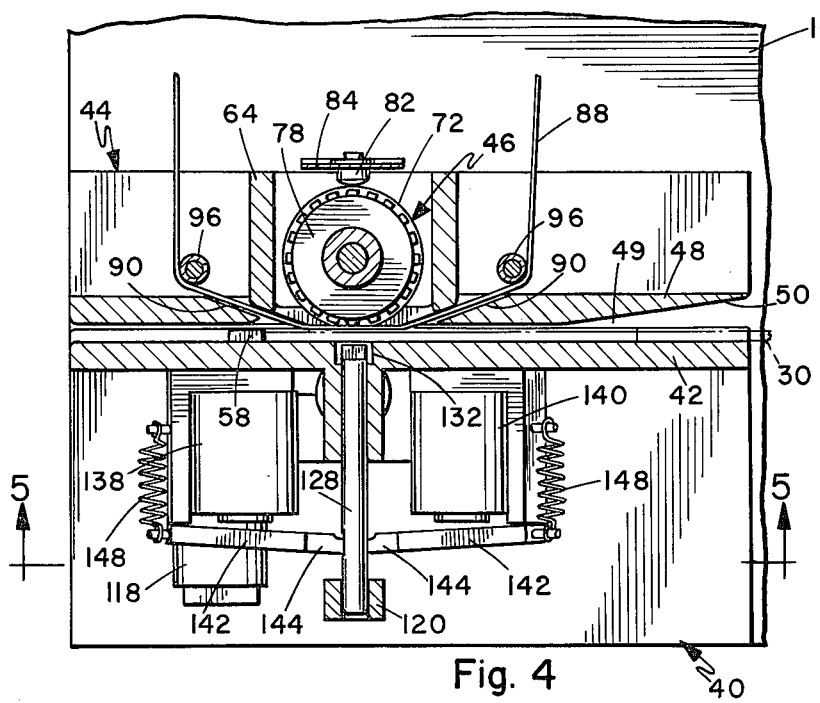
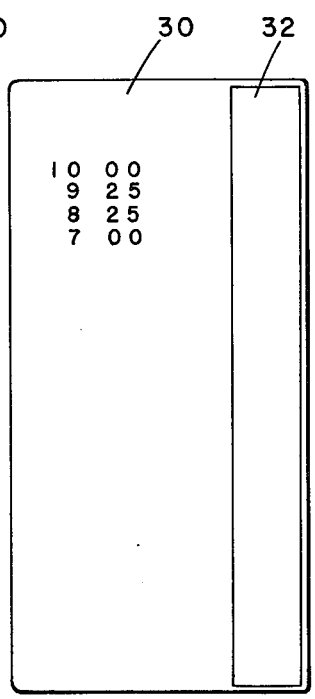
Fig. 4
Fig. 6
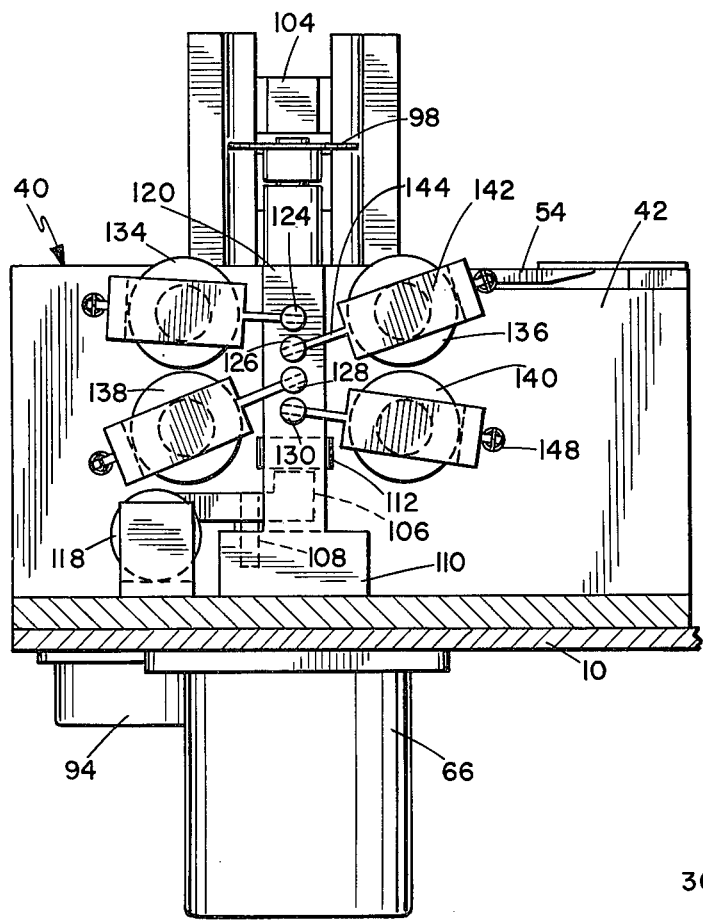
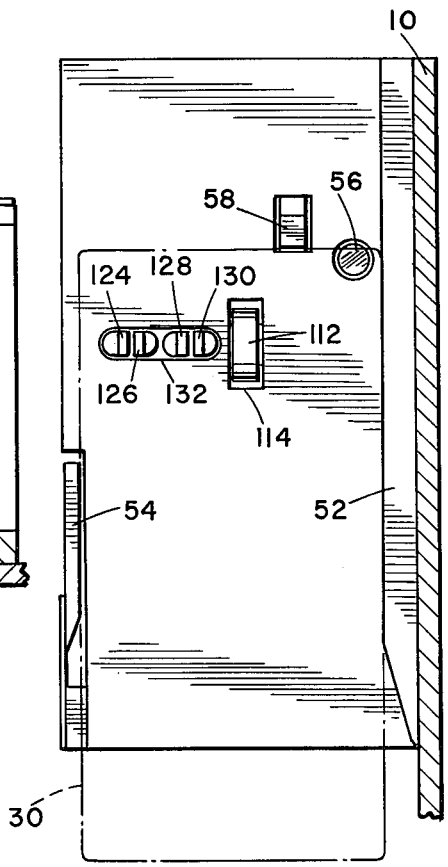
Fig. 5
Fig. 7

TICKET ADVANCE AND PRINTER MECHANISM

BACKGROUND OF THE INVENTION

In ticket handling apparatus in which a value or other data must be printed on a ticket, the basic essential needs are means for feeding the ticket through, or into and out of the mechanism, and means for performing the printing operation. Some systems utilize a ticket which is purchased for an initial value, and the cost of services is deducted from that value at each use. When the value is constant, or one of a few selectable increments, the printer can be preset to update the ticket value in a simple manner.

When the value of service is variable, however, as for transportation between various points in a rapid transit system, the value must be determined at each use. In one type of system not in use, the ticket carries a magnetic stripe, on which pertinent data, such as ticket value, point of entry into the system and other such information, are recorded in coded form. At the point of exit, the ticket handling machine reads this information, the appropriate value of service is calculated and the magnetic record is suitably updated. For benefit of the ticket holder the updated value is also printed on the ticket. The system is, of course, controlled by and all calculations and data updating performed by a computer.

Since speed is of the essence in a rapid transit system, the printing must be accomplished in a very short time. Manual insertion and removal of a ticket is not desirable, because the speed of ticket motion is not constant, insertion may not be perfect and fumbling can prevent proper operation. It is thus preferably to feed a ticket through the mechanism automatically.

Printing mechanisms are a problem in a high speed automatic operation, since the required value must be set up in a fraction of a second and the printing accomplished either while the ticket is moving, or when the ticket is stopped. Printing on a moving ticket has obvious problems and usually involves a moving printer head and precise timing. Stopping the ticket at the precise position for successive line printing is also difficult and the results have been far from satisfactory.

SUMMARY OF THE INVENTION

The mechanism described herein handles a ticket having a magnetic stripe carrying the essential coded data. After passing through the magnetic readout and update stage, the ticket is fed into the printer mechanism.

The printer has a multiple character print drum and a ticket drive wheel mounted on a common shaft, which is driven by a high speed stepper motor. A ticket strikes a reference stop and its presence is detected by an optical sensor. The stop is retracted and a pinch roller is applied to hold the ticket against the drive wheel. The stepper motor then advances the ticket in increments of character line spacing until the next vacant line position is reached, as determined by the data in the magnetic record. Positioning is a simple matter of step counting and is precise. At that position, the pinch roller is retracted and the ticket remains stationary while the stepper motor continues to rotate the print drum.

The print drum has multiple wheels, each with characters circumferentially spaced in sequence around the periphery. On the print drum is a zero indicator, the position of which is determined by a sensor to indicate when the zero is in printing position. By simple step counting, it is possible to determine when each appropriate character reaches the print position, at which point a solenoid actuated print hammer makes the impression through a coated ribbon, which is advanced between the print drum and ticket. When the sequence is completed the pinch roller is again engaged and the stepped drive ejects the ticket. No precise synchronization moving elements is necessary, the ticket being stationary during printing and all actions being timed by counting steps of the stepper motor in accordance with the computed data. At a stepper motor speed on the order of 100 pulses per second, a ticket can be processed through the entire mechanism in less than one second.

The primary object of this invention, therefore, is to provide a new and improved ticket advance and printer mechanism.

Another object of this invention is to provide a mechanism by which a ticket of known initial value is updated each time a service is rendered.

Another object of this invention is to provide a printer mechanism in which the ticket drive and character positioning means are driven by a common stepper motor in precise increments related to the printing action.

A further object of this invention is to provide a ticket advance and printer mechanism which is adaptable to certain existing types of ticket handling systems.

Other objects and many attendant advantages will be apparent in the following detailed description and upon an examination of the drawings, wherein like reference numerals designate like parts throughout and in which:

FIG. 4 is a sectional view taken on line 4—4 of FIG. 3.

FIG. 5 is a sectional view taken on line 5—5 of FIG. 4.

FIG. 6 is a top plan view of a typical ticket.

FIG. 7 is a sectional view taken on line 7—7 of FIG. 3.

DESCRIPTION OF THE PREFERRED EMBODIMENT

The mechanism is adaptable to various installations, such as in a ticket machine, turnstile, or the like, and may be attached to existing support structure of any configuration. For purposes of illustration, the mechanism is shown mounted on a support panel 10, which is representative.

Figure 1:
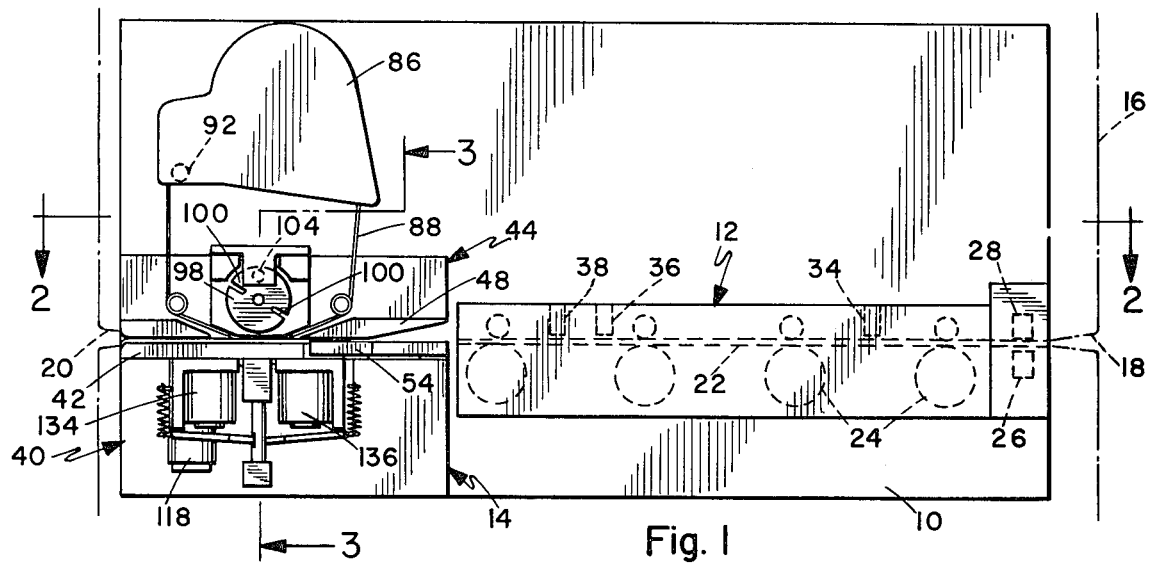
FIG. 1 is a side elevation view of the mechanism.
Figure 2:
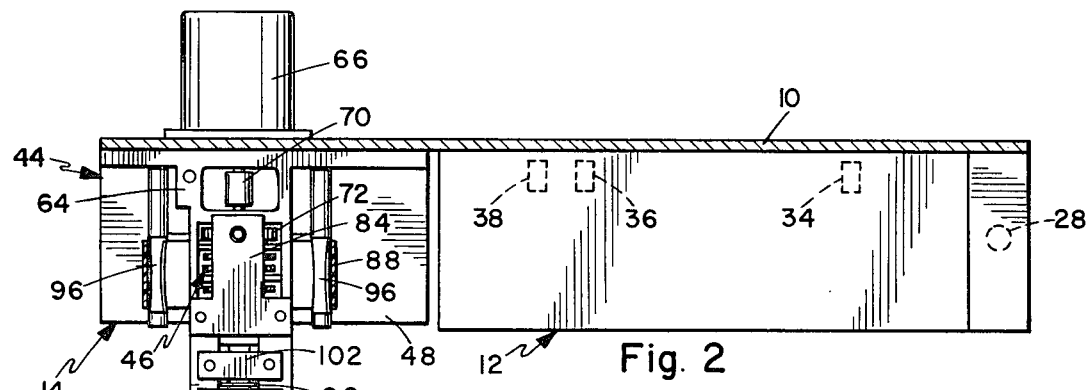
FIG. 2 is a sectional view taken on line 2—2 of FIG. 1.
Figure 3:
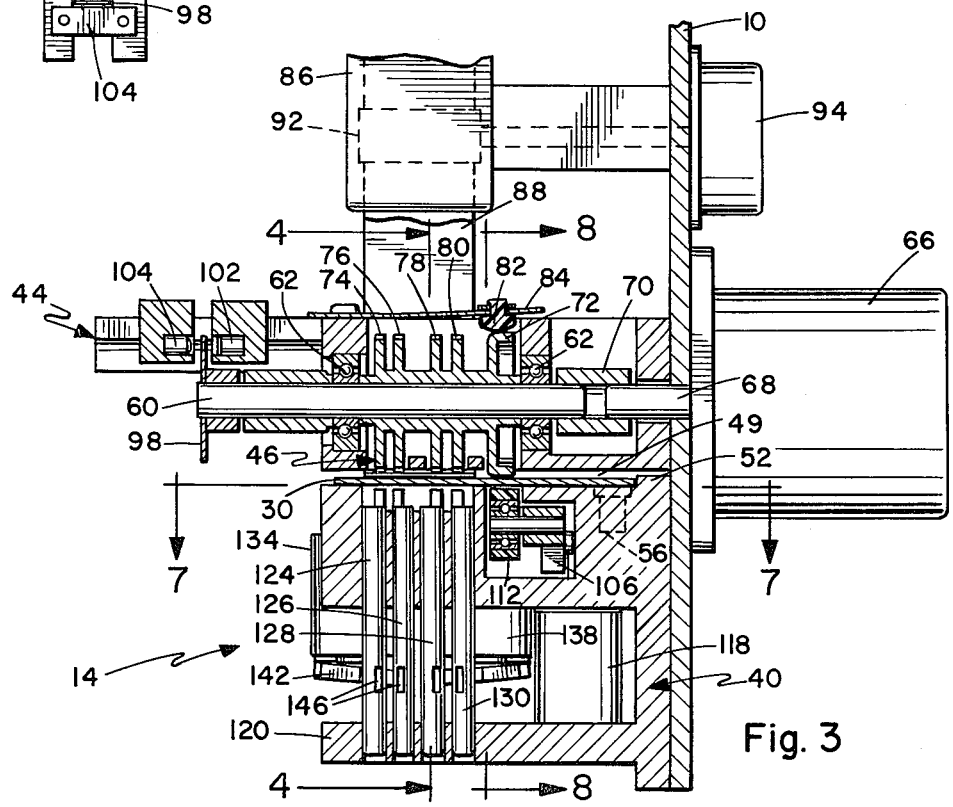
FIG. 3 is an enlarged sectional view taken on line 3—3 of FIG. 1.

The mechanism includes an input stage 12, in which the magnetic readout and update functions are performed, and a printer stage 14 where the printing action occurs. A cabinet 16, indicated fragmentarily in broken line in FIG. 1, has an entry slot 18 in which a ticket is inserted, and an exit slot 20 from which the ticket is ejected.

The input stage 12 has a longitudinal track 22, of any suitable configuration, through which a ticket is advanced by driven rollers 24, or other such means. The specific driving and guiding means may vary to suit the particular installation. Adjacent the entry slot 18 is an entry sensor 26, which may be a photodiode sensing the interruption of light from a light source, such as a light emitting diode or LED 28.

The ticket 30, illustrated in FIG. 6, is a rectangular element of cardboard, plastic, or other suitable material, with a stripe 32 of magnetic recording material along one longitudinal side. Identification and information matter would be printed on the ticket as required.

In the input stage are a read head 34, a write head 36 and a verify head 38, spaced in that sequence along the path of the ticket to scan the stripe 32 as the ticket passes. The read head 34 reads the data recorded on stripe 32 and conveys it to the computer, which is a part of the complete system. The data would normally include the remaining value of the ticket, point of last entry if applicable and, if needed, data and time or similar reference data. Write head 36 rewrites some or all of the data on the stripe 32 and verify head reads the updated data on the stripe. The techniques involved are well known and the apparatus is available in various forms. From the input stage, the ticket is driven into the printer stage 14.

The printer has a lower platen unit 40 with a flat platen 42 over which the ticket passes, and an upper head unit 44 containing the print drum 46. The lower portion of head unit 44 has a guide flange 48 parallel to and spaced from platen 42 to provide a narrow channel 49 for the ticket. The leading edge of guide flange 48 has an inclined entry ramp 50 to ensure proper entry of the ticket. The side of platen 42 adjacent the support panel 10 has a raised guide rib 52 and the opposite side of the platen has a spring biased retaining arm 54 to hold the ticket in longitudinal alignment, as in FIG. 7. Any other suitable guide means may be used to keep the ticket aligned. Inset in platen 42 is a sensor 56 which detects the arrival of a ticket at an initial position against a stop 58 projecting upwardly through the platen into channel 49. The mounting and operation of the stop will be described hereinafter.

Print drum 46 has a shaft 60 mounted in bearings 62 in the frame 64 of head unit 44. The axis of shaft 60 is parallel to the ticket supporting face of platen 42 and perpendicular to the direction of motion of the ticket. A stepper motor 66 is mounted on support panel 10 and has an output shaft 68, which is connected to shaft 60 by a drive coupling 70.

The print drum 46 has a plurality of axially spaced character wheels and a drive wheel 72. As illustrated, the character wheels comprise one pair of wheels 74 and 76 for dollars and a pair of wheels 78 and 80 for cents, providing for a maximum value of $99.99. Any suitable number and arrangement of wheels may be used depending on the values and print out required. The numerals are circumferentially spaced around the wheels, sequentially from 0 to 9, plus * and #, all wheels being similar. That is, a specific numeral is in print position on all wheels simultaneously. Preferably there are two sequences of numbers on a wheel, from 0 to 9 in 180° of rotation, so that each number passes the print position twice in each revolution. It has been found possible to put 0.125" high characters on a 1.0" diameter wheel in this manner. Stepper motor 66 advances the print drum one character at a time and drive wheel 72, in contact with the ticket, simultaneously advances the ticket one line spacing. To supplement electrical damping of the print drum at stop positions, a damper pad 82, mounted on a leaf spring 84 on frame 64, rides on drive wheel 72.

Mounted on support panel 10 above the head unit 44 is a replaceable ribbon cartridge 86 containing an endless printing ribbon 88. The ribbon is threaded through slots 90 in guide flange 48 and passes under print drum 46 above the ticket. Cartridge 86 is a standard item and the ribbon is driven by a roller 92 in the cartridge to maintain a fresh printing surface at the print position. A motor 94, mounted on support panel 10, is coupled to roller 92 to advance the ribbon. Freely rotatable guide roller 96 guide the ribbon 88 smoothly through slots 90.

Shaft 60 extends outwardly from the print drum and fixed to the outer end of the shaft is a zero indicator disc 98, having diametrically opposed radial slits 100. Mounted on the frame 64 facing disc 98 is a sensor 102, which detects light from an LED 104 on the opposite side of the disc, through slits 100. The disc 98 is oriented with respect to the print drum 46 so that, when a slit 100 is positioned between the sensor 102 and LED 104, the zeros of the print drum are in the print position. Sensor 102 may be suitably masked for precise detection of the zero position of the print drum.

Figure 8:
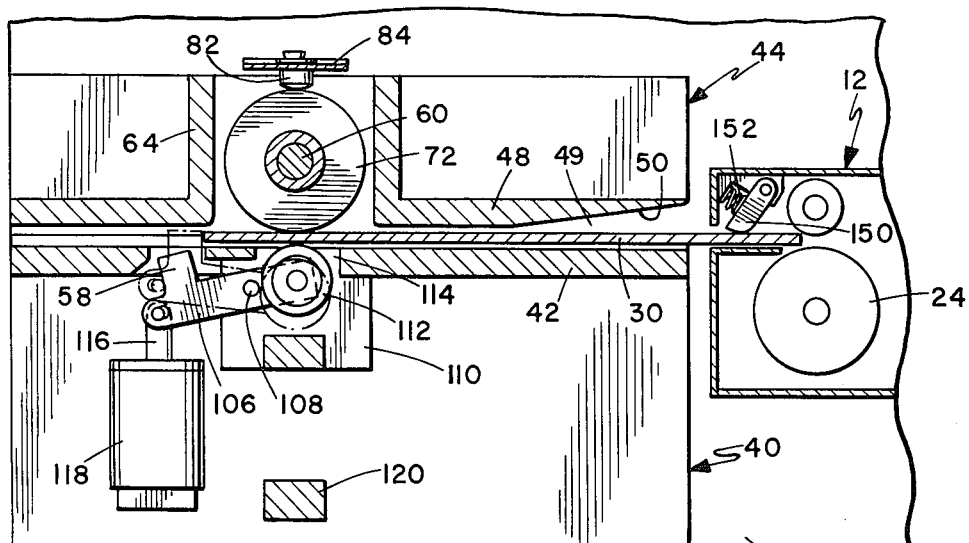
FIG. 8 is a sectional view taken on line 8—8 of FIG. 3.

Stop 58 is fixed on one end of a rocker arm 106, which is pivotally mounted on a hinge pin 108 on the frame 110 of platen unit 40. On the other end of rocker arm 106 is a freely rotatable pinch roller 112, which projects through a slot 114 in platen 42, immediately below drive wheel 72. Coupled to the rocker arm 106 adjacent stop 58 is the plunger 116 of a solenoid 118. When the solenoid is actuated, the plunger pulls stop 58 down below the surface of platen 42 and forces pinch roller 112 upwardly to hold ticket 30 firmly against drive wheel 72, as in the full line position in FIG. 8. Solenoid 118 may be of the spring biased type which extends the plunger when de-energized, or any suitable spring return means may be used to retract the pinch roller to the broken line position in FIG. 8. To prevent the ticket 30 from bouncing back after striking stop 58, a pawl 150 is pivotally mounted at the exit end of input stage 12. The pawl 150 is biased by a spring 152 to bear against the ticket and allow movement only in the exit direction, as in FIG. 8.

Mounted below platen 42 are print hammers which are vertically slidable in the frame 110 and in a lower guide 120. One print hammer is positioned below each character wheel, the hammers 124, 126, 128 and 130 being aligned respectively with character wheels 74, 76, 78 and 80, through a slot 132 in platen 42. The print hammers are actuated respectively by solenoids 134, 136, 138, and 140, each solenoid having an armature 142 with an extended arm 144 which engages in a slot 146 in the respective hammer. Each armature 142 is connected to a return spring 148 to hold the connected hammer down.

Figure 9:
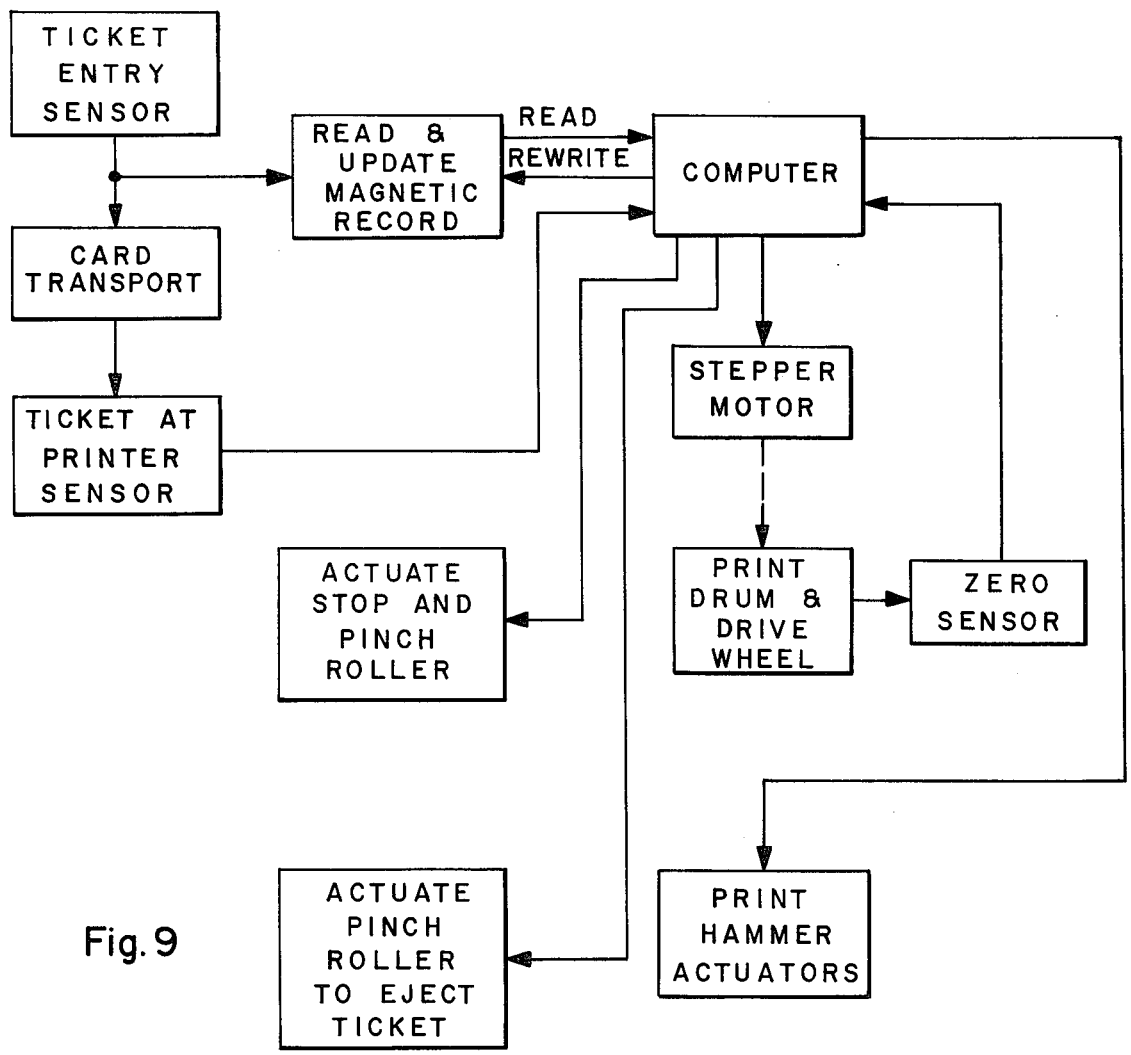
FIG. 9 is a functional block diagram of the operation of the system.

The sequence of operations is shown in the block diagram in FIG. 9. It is assumed that the ticket 30 has been issued with its face value of $10.00, printed on the top or first line, as in FIG. 6. Upon the first use, as at an entry point into a transportation system, the entry point identification is coded on the magnetic stripe 32.

Upon leaving the transportation system, the card is fed into the ticket machine through entry slot 18 and is detected by sensor 26. This causes the transport mechanism to operate and feed the ticket through the input stage 12. The data on stripe 32 is read by head 34, the point of exit being compared to the point of entry and the fare calculated by the computer. Write head 36 rewrites the data and verify head 38 reads the updated information, including the new value of the ticket after deduction of the fare, which in this example is 75 cents.

The ticket 30 is fed into the channel 49 of printer stage 14 and reaches stop 58, where its arrival is detected by sensor 56. This causes operation of solenoid 118, which retracts stop 58 and engages pinch roller 112 with the ticket, to hold the ticket in driving contact with drive wheel 72. Stepper motor 66 advances the ticket in single line increments until the next blank line is reached, as determined by the data on stripe 32, at which point the circuit to the print hammer actuating solenoids is enabled.

The new value of the ticket, which is $9.25 after deduction of the last fare, is stored in the computer and must be applied to the printer. The stepper motor first drives the print drum 46 to the zero position, then the pinch roller is actuated to advance the ticket to the correct line position. The pinch roller is then retracted and the print drum rotation is continued to the desired character positions. When the numeral 2, which is earliest in the sequences, reaches the print position, solenoid 138 is actuated to fire hammer 128 and print the numeral 2 is the correct column from wheel 78. When numeral 5 reaches the print position, solenoid 140 is actuated to fire hammer 130 and print numeral 5 from wheel 80. Similarly, when numeral 9 reaches the print position, solenoid 136 fires hammer 126 to print the numeral 9 from wheel 76. All three numerals (four when required) are thus printed in one half of a revolution of the print dru, by proper sequential actionof the hammer solenoids. This is accomplished while the ticket is stationary and alignment is precise. Subsequent updated ticket values are indicated in consecutive line spacing positions, for reference, in FIG. 6.

When the printing sequence is completed, the solenoid 118 is again actuated to engage pinch roller 112 and allow stepper motor 66 to drive the ticket through the printer and out of exit slot 20. The passing of the ticket beyond sensor 56 indicates the end of the cycle.

Since the single stepper motor drives the ticket through the printer, positions the ticket and drives the print drum in sequential steps which the ticket is held stationary, there is no need for elaborate timing or synchronizing means. It has been found that the mechanism can function reliably and consistently with the stepper motor operating at about 100 pulses per second. At this speed, a ticket passes through the printer very rapidly. Magnetic recording techniques also permit very fast transit of a ticket through the input stage, resulting in a total processing time for a ticket of less than one second.

Having described our invention, we now claim.

1. A ticket advance and printer mechanism, comprising:

an input stage having an entry portion for receiving a ticket;

a printer stage positioned to receive a ticket from said input stage;

said printer stage including an upper head unit and a lower platen unit having a flat ticket supporting platen;

said head unit having a guide flange parallel to and spaced from said platen and defining a ticket conducting channel therebetween;

stepper motor drive means on said printer stage for driving a ticket through said channel in sequential steps;

drive actuating means for selectively engaging and disengaging said drive means;

a rotatable print drum driven in sequential steps by said drive means, the print drum having a plurality of axially spaced character wheels, each with circumferentially spaced characters thereon;

said print drum having an axial shaft parallel to the platen and perpendicular to the path of the ticket through said channel, and being mounted in said head unit and protruding into said channel through said guide flange;

said drive means including a ticket engaging drive wheel on said shaft and fixed with the print drum;

said drive actuating means including an arm pivotally mounted on said platen unit, with a pinch roller rotataby mounted on one end of the arm, the platen having a slot through which said pinch roller protrudes opposite said drive wheel, and an actuator coupled to said arm for selectively moving said pinch roller into and out of driving engagement with said drive wheel;

a ticket engaging stop on said arm on the side of the pivot opposite said pinch roller, said stop protruding through said platen into the channel when the pinch roller is out of driving engagement with the drive wheel, and being retracted clear of the channel when the pinch roller is in the driving engagement position;

a plurality of print hammers mounted on the opposite side of the channel from the print drum, each hammer being aligned with one of said character wheels;

a printing ribbon extending between said print drum and hammers;

and hammer actuating means for actuating the hammers in a selected sequency while said drive means is disengaged.

2. A ticket advance and printer mechanism according to claim 1, wherein said print hammers are mounted below pass through said platen, said hammer actuating means inlcuding an individualactuator coupled to each hammer.

* * * * *